United States Patent
Hsu et al.

(10) Patent No.: US 11,305,816 B2
(45) Date of Patent: Apr. 19, 2022

(54) DEPLOYABLE QUAD VEHICLE

(71) Applicant: HONDA MOTOR CO., LTD., Tokyo (JP)

(72) Inventors: Ricky Jukuei Hsu, Rancho Palos Verdes, CA (US); Michael Mcgee, Glendora, CA (US)

(73) Assignee: HONDA MOTOR CO., LTD., Tokyo (JP)

( * ) Notice: Subject to any disclaimer, the term of this patent is extended or adjusted under 35 U.S.C. 154(b) by 529 days.

(21) Appl. No.: 16/384,291

(22) Filed: Apr. 15, 2019

(65) Prior Publication Data

US 2020/0324813 A1 Oct. 15, 2020

(51) Int. Cl.
| | | |
|---|---|---|
| *B62D 9/00* | (2006.01) | |
| *B60K 7/00* | (2006.01) | |
| *B62D 1/02* | (2006.01) | |
| *B62D 61/12* | (2006.01) | |
| *B62J 1/12* | (2006.01) | |

(Continued)

(52) U.S. Cl.
CPC .............. *B62D 9/002* (2013.01); *B60K 7/00* (2013.01); *B60K 7/0007* (2013.01); *B62D 1/02* (2013.01); *B62D 61/12* (2013.01); *B60K 2007/0092* (2013.01); *B62J 1/12* (2013.01); *B62J 25/06* (2020.02); *B62J 45/416* (2020.02); *B62K 5/01* (2013.01); *B62K 21/18* (2013.01)

(58) Field of Classification Search
CPC .......... B62D 9/002; B62D 1/02; B62D 61/12; B60K 7/00; B60K 7/0007; B60K 2007/0092; B60K 17/356; B60K 17/358; B60K 2007/0038; B62J 1/12; B62J 25/06; B62J 45/416; B62K 5/01; B62K 15/008; B62K 21/18; B62K 2204/00; B60G 2204/46; B60G 17/005; B60G 2200/132; B60G 3/14; B60G 2202/40; B60G 2300/07; B60G 2300/124; B60G 2300/45; B60G 2300/50; B60G 2500/30; B60G 2600/20; B60Y 2200/124; B60Y 2200/43
See application file for complete search history.

(56) References Cited

U.S. PATENT DOCUMENTS

| | | | | |
|---|---|---|---|---|
| 6,553,271 B1* | 4/2003 | Morrell | ................... | B60L 50/60 700/75 |
| 6,789,640 B1* | 9/2004 | Arling | ................... | A63C 17/12 180/282 |

(Continued)

FOREIGN PATENT DOCUMENTS

| | | |
|---|---|---|
| EP | 1046574 B1 | 8/2003 |
| WO | WO 2006/095211 A1 | 9/2006 |

*Primary Examiner* — Kevin Hurley
*Assistant Examiner* — Marlon A Arce
(74) *Attorney, Agent, or Firm* — ArentFox Schiff LLP

(57) ABSTRACT

The disclosure provides an electric quad vehicle, a control system, and method of operation. The electric quad vehicle may include a central hub and four legs, each pivotably mounted to the central hub, each leg including an electric motor rotatably coupled to a wheel. Each leg may include a joint allowing the leg to bend to a retracted state with the wheel adjacent the central hub. The electric quad vehicle may include handle bars extending from the central hub including rider controls of acceleration and steering. The electric quad vehicle may include a control system configured to translate rider input to the rider controls into control signals for each of the electric motors.

18 Claims, 6 Drawing Sheets

(51) Int. Cl.
*B62K 21/18* (2006.01)
*B62J 25/06* (2020.01)
*B62J 45/416* (2020.01)
*B62K 5/01* (2013.01)

(56) References Cited

U.S. PATENT DOCUMENTS

| | | | |
|---|---|---|---|
| 7,278,507 B2 | 10/2007 | Walworth | |
| 7,426,970 B2 * | 9/2008 | Olsen | A61G 5/1059 |
| | | | 180/65.1 |
| 7,757,794 B2 * | 7/2010 | Heinzmann | B60L 15/2045 |
| | | | 180/6.5 |
| 7,950,977 B2 | 5/2011 | Sun et al. | |
| 9,211,932 B1 | 12/2015 | Huennekens et al. | |
| 9,499,215 B2 * | 11/2016 | Theodore | B62K 15/006 |
| 10,052,247 B2 * | 8/2018 | Vereen, III | A61G 5/1091 |
| 10,926,756 B2 * | 2/2021 | Dastous | B60W 10/08 |
| 2016/0016629 A1 * | 1/2016 | Wang | B62K 13/08 |
| | | | 180/208 |
| 2018/0111540 A1 | 4/2018 | Van Bebber et al. | |
| 2018/0154980 A1 * | 6/2018 | Lee | B60L 50/20 |
| 2019/0233034 A1 * | 8/2019 | Viele | B62D 49/007 |

* cited by examiner

DEPLOYABLE QUAD VEHICLE

TECHNICAL FIELD

The subject matter disclosed herein relates to all terrain vehicles and, more particularly, to an electric quad vehicle that may be deployed from another vehicle.

BACKGROUND

All terrain vehicles or four-wheelers may be used for a variety of recreational and utility purposes. Such vehicles typically have a relatively limited range compared to larger passenger vehicles. Further, such vehicles may be prohibited from driving on roadways. Accordingly, a person wishing to drive an all terrain vehicle may need to transport the all terrain vehicle to a recreational location. Conventional all terrain vehicles may be bulky and may be transported in a pickup truck or in a trailer.

In view of the foregoing, a quad vehicle that is easier to transport than conventional all terrain vehicles may be desirable. Further advantages will become apparent from the disclosure provided below.

SUMMARY

This summary is provided to introduce a selection of concepts in a simplified form that are further described below in the DETAILED DESCRIPTION. This summary is not intended to identify key features of the claimed subject matter, nor is it intended to be used as an aid in determining the scope of the claimed subject matter.

In an aspect, the disclosure provides an electric quad vehicle. The electric quad vehicle may include a central hub and four legs, each pivotably mounted to the central hub, each leg including an electric motor rotatably coupled to a wheel. Each leg may include a joint allowing the leg to bend to a retracted state with the wheel adjacent to the central hub. The electric quad vehicle may include handle bars extending from the central hub including rider controls of acceleration and steering. The electric quad vehicle may include a control system configured to translate rider input to the rider controls into control signals for each of the electric motors.

In another aspect, the disclosure provides a method of operating an electric quad vehicle. The method may include receiving input signals from rider controls indicating a relative acceleration amount and a relative steering amount. The method may include generating control signals for each of four drive motors based on at least the input signals. The method may include controlling a power output to each of the four drive motors according to the respective control signal.

In another aspect, the disclosure provides a vehicle control system including a memory and a processor communicatively coupled to the memory. The processor may be configured to receive input signals from a rider indicating a relative acceleration amount and a relative steering amount. The processor may be configured to generate control signals for each of four drive motors based on at least the input signals. The processor may be configured to control a power output to each of the four drive motors according to the respective control signal.

BRIEF DESCRIPTION OF THE DRAWINGS

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further objects and advances thereof, will be best understood by reference to the following detailed description of illustrative aspects of the disclosure when read in conjunction with the accompanying drawings, wherein:

DETAILED DESCRIPTION

Figure 1:
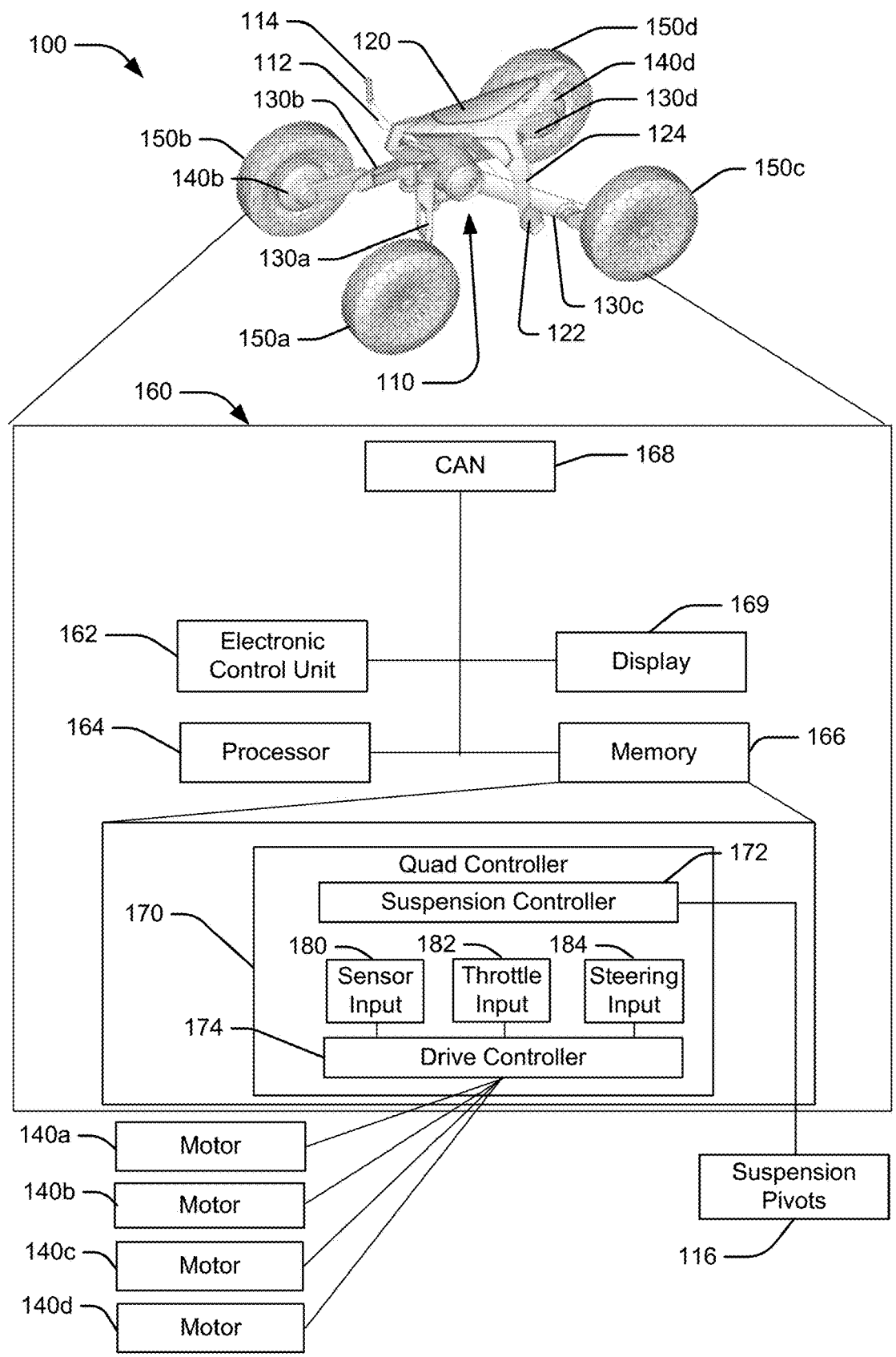
FIG. 1 illustrates a schematic view of an example quad vehicle in accordance with aspects of the present disclosure.

The following includes definitions of selected terms employed herein. The definitions include various examples and/or forms of components that fall within the scope of a term and that may be used for implementation. The examples are not intended to be limiting.

A "processor," as used herein, processes signals and performs general computing and arithmetic functions. Signals processed by the processor may include digital signals, data signals, computer instructions, processor instructions, messages, a bit, a bit stream, or other computing that may be received, transmitted and/or detected.

A "bus," as used herein, refers to an interconnected architecture that is operably connected to transfer data between computer components within a singular or multiple systems. The bus may be a memory bus, a memory controller, a peripheral bus, an external bus, a crossbar switch, and/or a local bus, among others. The bus may also be a vehicle bus that interconnects components inside a vehicle using protocols, such as Controller Area network (CAN), Local Interconnect Network (LIN), among others.

A "memory," as used herein may include volatile memory and/or non-volatile memory. Non-volatile memory may include, for example, ROM (read only memory), PROM (programmable read only memory), EPROM (erasable PROM) and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDR SDRAM), and/or direct RAM bus RAM (DRRAM).

An "operable connection," as used herein may include a connection by which entities are "operably connected", is one in which signals, physical communications, and/or logical communications may be sent and/or received. An operable connection may include a physical interface, a data interface and/or an electrical interface.

A "vehicle," as used herein, refers to any moving vehicle that is powered by any form of energy. A vehicle may carry human occupants or cargo. The term "vehicle" includes, but is not limited to: cars, trucks, vans, minivans, SUVs, motorcycles, scooters, boats, personal watercraft, and aircraft. In some cases, a motor vehicle includes one or more engines.

The term "graphical user interface," "GUI," or "user interface," as used herein, can refer to a type of interface that allows users to interact with electronic devices, the vehicle system, the vehicle, vehicle applications or the like, through graphical icons, visual indicators such as secondary notation, text-based, type command labels, text navigation, and the like.

The term "screen," "display screen," or "display," as used herein, can refer to a surface area upon which text, graphics and video are temporarily made to appear for human viewing. These may include, but are not limited to, eidophor, electroluminescent display ("ELD"), electronic paper, e-Ink, gyricon, light emitting diode display ("LED"), cathode ray tube ("CRT"), liquid-crystal display ("LCD"), plasma display panel ("PDP"), digital light processing ("DLP"), and the like.

In an aspect, the present disclosure provides an electric quad vehicle with a retractable suspension that allows the quad vehicle to be stored and/or transported in a smaller space. For example, the quad vehicle may be stored within a passenger vehicle in a retracted state and deployed at a destination into an expanded state. In the expanded state, the quad vehicle may support one or more riders.

Turning to FIG. 1, an example quad vehicle 100 is schematically illustrated. The quad vehicle 100 may include a central hub 110 that pivotably couples four legs 130 (130a, 130b, 130c, 130d). The central hub 110 may support a saddle 120 that covers the central hub 110 and supports the rider. The saddle 120 may include a central seat and two flexible side extensions 124 that extend downward to foot supports 122. The central hub 110 may also include handlebars 112 for the rider to hold. The handlebars 112 may include controls 114 that the rider may use to indicate throttle and turning. The handlebars 112 may fold downward into a recess of the central hub 110.

In an aspect, the quad vehicle 100 may be an electric quad vehicle. The central hub 110 may include a power source such as a battery or fuel cell. The power source may provide electric current for controlling a rotary suspension and for powering electric drive motors. The quad vehicle 100 may include a control system 160 that controls power distribution and control signals.

The example quad vehicle 100 may include a rotary suspension including the four legs 130a, 130b, 130c, 130d. Each leg 130 may pivot vertically with respect to the central hub 110. The pivots may be biased to rotate the legs in a downward direction. That is, the forward legs 130a, 130b may be biased to rotate counter-clockwise when viewed from the outside, and the rear legs 130c, 130d may be biased to rotate clockwise when viewed from the outside. In an aspect, the biasing force may be supplied, adjusted, and/or varied electronically by the control system 160. For example, each pivot may include an electro-magnetic actuator that biases the respective leg downward. The biasing force (e.g., a variable downward force) may be adjusted for the weight of the rider. Additionally, in an aspect, the biasing force may be dynamically adapted to absorb shocks, for example, due to uneven terrain. The biasing force may also be adapted based on steering controls to allow the quad vehicle 100 to lean into turns.

Each leg 130 may include a respective electric motor 140 that drives a respective wheel 150. The electric motor 140 may be located at the end of the leg 130. In an aspect, the electric motor 140 may be a hub motor that resides within the respective wheel 150. The four electric motors 140a, 140b, 140c, 140d and respective wheels 150a, 150b, 150c, 150d, may provide all-wheel drive and all-wheel steering for the quad vehicle 100. As discussed in further detail below, the control system 160 may individually control each of the motors 140 to drive the respective wheel 150. Accordingly, power may be distributed to effectively propel the quad vehicle 100. Additionally, the all-wheel steering may operate without mechanical turning of the wheels 150. By driving the wheels 150 at different speeds, the quad vehicle 100 may be turned in the direction of the slower wheels 150. In an aspect, for example, the quad vehicle 100 may perform a stationary turn by driving wheels 150a and 150c in one direction and driving the wheels 150b and 150d in the opposite direction.

The control system 160 may reside within the vehicle 100. The components of the control system 160, as well as the components of other systems, hardware architectures, and software architectures discussed herein, may be combined, omitted or organized into various implementations.

The control system 160 may generally include an electronic control unit (ECU) 112 that operably controls a plurality of vehicle systems. The vehicle systems may include, but are not limited to a suspension control system, a steering control system, an acceleration control system, and the like. The control system 160 may also include a processor 164 and a memory 166 that communicate with the ECU 162, and controller area network (CAN) 168. The control system 160 may also include a display device 169 that may provide information to a rider such as speed and remaining power.

The ECU 162 may include internal processing memory, an interface circuit, and bus lines for transferring data, sending commands, and communicating with the vehicle systems. The ECU 162 may include an internal processor and memory, not shown. The vehicle 100 may also include a bus for sending data internally among the various components of the control system 160.

The memory 166 may store instructions executable by the processor 164 for carrying out the methods described herein. Further, the memory 166 may store parameters for carrying out the methods described herein. For example, the memory 166 may store a quad controller 170, which may include software executable by the processor 164 for operating the control system 160. The quad controller 170 may also include a suspension controller 172 for controlling the rotary suspension and a drive controller 174 for controlling the motors 150. In an aspect, the drive controller 174 may generate motor control signals based on one or more of a sensor input 180, a throttle input 182, and a steering input 184. For example, the throttle input 182 may be based on rider input to the controls 114, for example, indicating a throttle level or value. Similarly, the steering input 184 may be a steering value based on rider input to the controls 114. For example, a steering sensor may generate the steering value based on torque applied to the handlebars 112. In another aspect, a control 114 on each handlebar 112 may generate an acceleration signal and a difference in the acceleration signals may be a steering signal. The sensor input 180 may be, for example, based on a biometric reading (e.g., heart rate, electrodermal activity) of the rider that indicates a stress level. The drive controller 174 may, for example, reduce speed of the quad vehicle 100 in response to high stress levels.

Figure 2:
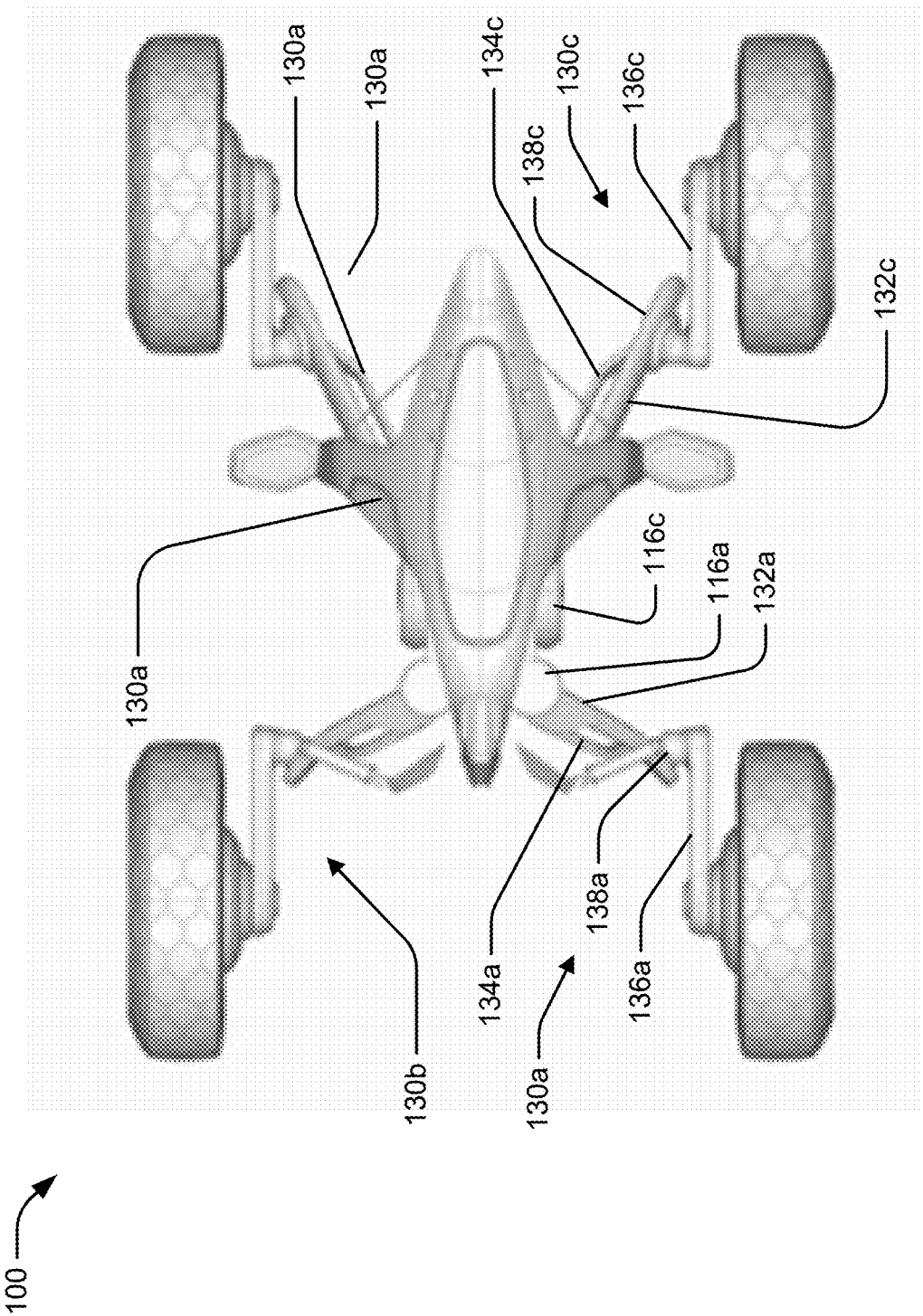
FIG. 2 illustrates a top view of the example quad vehicle in accordance with aspects of the present disclosure.

FIG. 2 illustrates a top view of the example vehicle 100 in an expanded state. An example structure of the legs 130 can be seen. A forward leg 130*a* may include a first leg segment 132*a* coupled to the central hub 110 at a pivot 116*a*. The first leg segment 132*a* may also include a support 134*a* that extends parallel to the first leg segment 132. The support 134*a* may allow the first leg segment 132*a* a limited degree of lateral flexibility. The support 134*a* may also support a joint 138*a* at which a second leg segment 136*a* is coupled to the first leg segment 132*a*. In an aspect, for example, the joint 138*a* may be a locking ball joint that allows the second leg segment 136*a* to rotate vertically and horizontally with respect to the first leg segment 132*a*. The joint 138*a* may be locked in various positions, for example, in the extended state and the retracted state.

The rear legs 130*c*, 130*d* may be similar to forward legs 130*a*, 130*b* and include first segments 132*c*, 132*d*, supports 134*c*, 134*d*, second leg segments 136*c*, 136*d*, and joints 138*c*, 138*d*. In an aspect, the first leg segment 132*c* may be longer than the first leg segment 132*a* to keep the rider's mass centered over the wheelbase.

Figure 3:
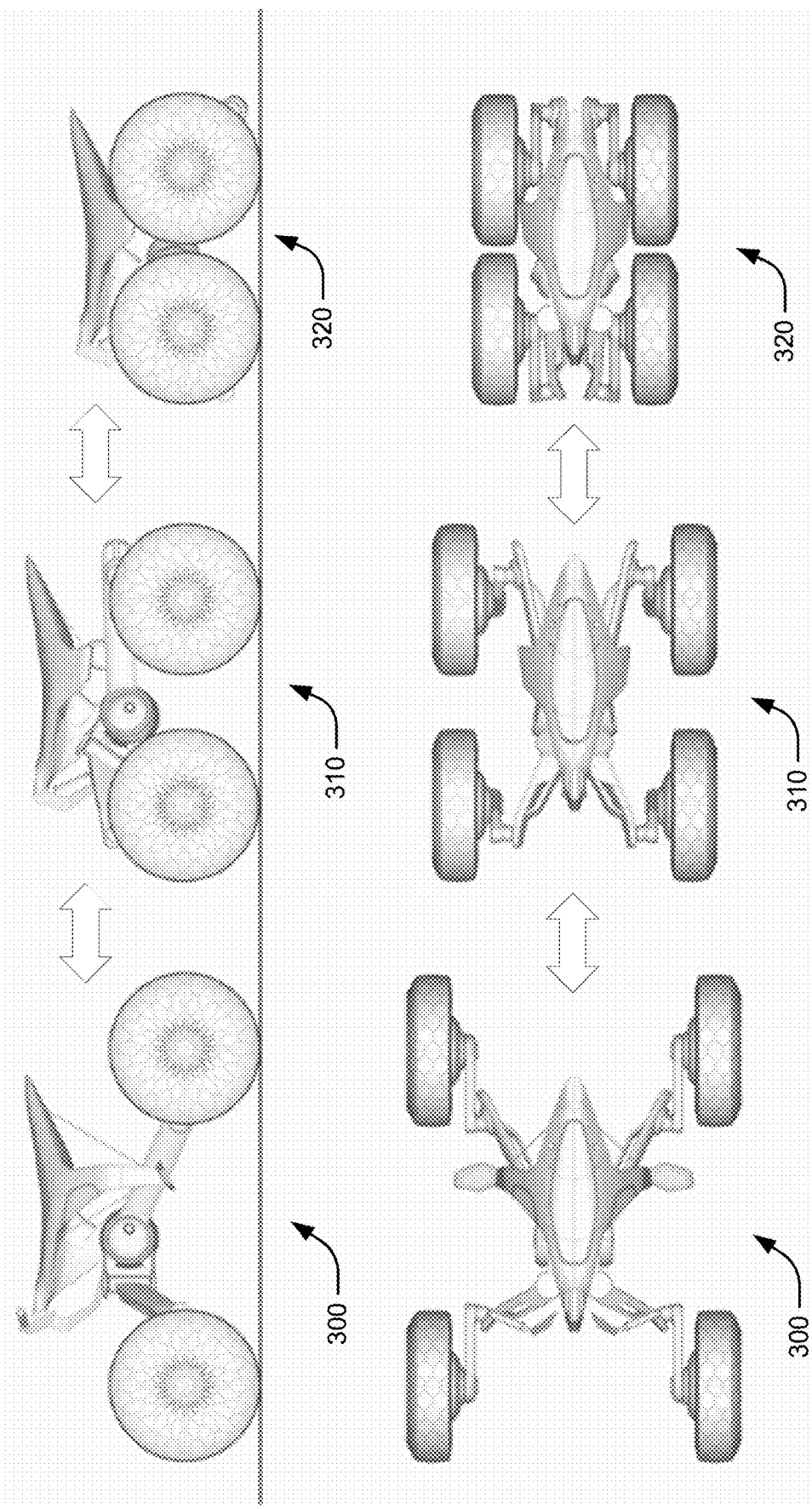
FIG. 3 illustrates side and top views of the example quad vehicle transitioning between and expanded state and a retracted state, in accordance with aspects of the present disclosure.

FIG. 3 illustrates side and top views of the vehicle 100 transitioning between the extended state 300 and a retracted state 320. In the extended state 300, the first leg segments 132 may be pivoted horizontally outward and vertically down from the central hub 110. The second leg segments 136*a*, 136*b* may be rotated about the joints 138 to extend forward, and the second leg segments 136*c*, 136*d* may be rotated about the joints 138 to extend rearward. Accordingly, the vehicle 100 may have a wide wheel base in the extended state. Additionally, the extensions 124 may extend downward, and the foot supports 122 may extend outward.

In an intermediate state 310, the second leg segments 136 may be rotated toward a vertical position. In an aspect, for example, the motors 140 may be driven to exert an upward rotational force on the second leg segments 136. For example, the front wheels 150*a*, 150*b* may be driven in reverse while the rear wheels 150*c*, 150*d* may be driven forward. Additionally, the first leg segments 132 may be pivoted horizontally inward at the central hub 110. Further, the first leg segments 132 may be pivoted vertically upward at the central hub 110. The extensions 124 may be bent inward and upward to provide space for the first segments 132*c*, 132*d* to move upward. The overall height of the vehicle 100 or saddle 120 may not change significantly between the extended state 300 the intermediate state 310 because the vertical orientation of the second leg segments 136 may offset the vertical rotation of the first leg segments 132.

Transitioning into the retracted state 320, the second leg segments 136*a*, 136*b* may be rotated to extend rearward from the joints 138*a*, 138*b*, and the second leg segments 136*c*, 136*d* may be rotated to extend forward from the joints 138*c* 138*d*. For example, the front wheels 150*a*, 150*b* may be driven in reverse while the rear wheels 150*c*, 150*d* may be driven forward. When the vehicle 100 is in the retracted state 320, each leg 130 may be in a retracted position with each of the joints 138 may be bent at an acute angle, which may reduce a total length of the leg 130 and bring the wheel adjacent to the central hub 110. The saddle 120 may be lowered as the second leg segments 136 rotate away from the vertical orientation. The first leg segments 132 may be further pivoted horizontally inward to a longitudinal orientation. The wheels 150 on each side may be separated by a small distance (e.g., 1-5 cm) to allow rotation. In the retracted state 320, the vehicle 100 may be driven over relatively level surfaces as the movement of the suspension may be limited. For example, the vehicle 100 may be driven along a road or up a ramp for storage or transportation while in the retracted state.

Transition from the retracted state 320 to the extended state 300 may be the reverse of the transition from the extended state 300 to the retracted state 320. For example, the front wheels 150*a*, 150*b* may be driven forward while the rear wheels 150*c*, 150*d* may be driven in reverse to rotate the second leg segments 136 toward a vertical orientation, then toward the central hub 110. The first leg segments 132 may be pivoted horizontally outward at the central hub 110. Further, the first leg segments 132 may be pivoted vertically downward at the central hub 110.

Figure 4:
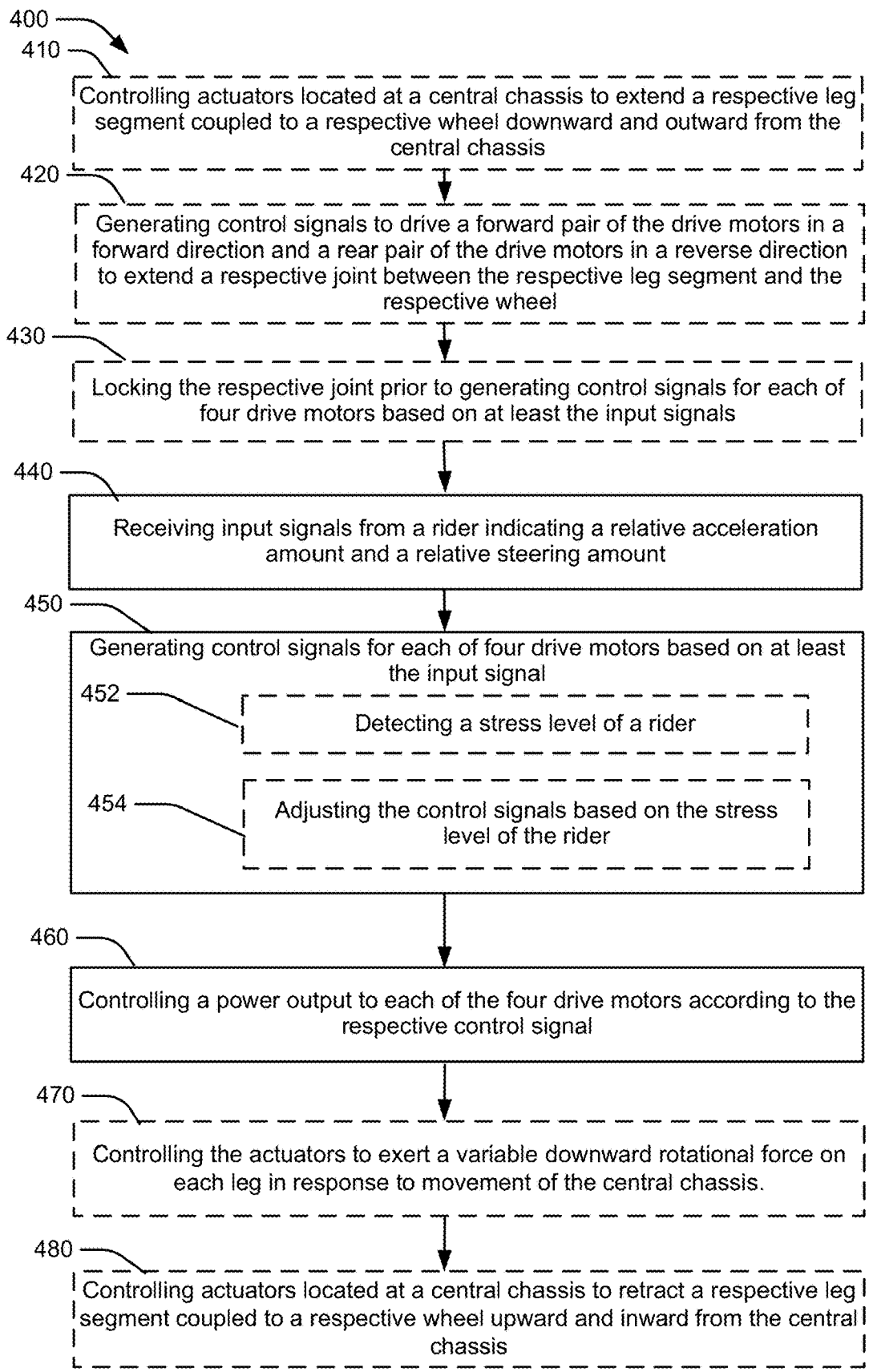
FIG. 4 is a flowchart of an example method of controlling an electric quad vehicle in accordance with aspects of the present disclosure.

FIG. 4 illustrates a flowchart of an example method 400 for controlling an electric quad vehicle. The method 400 may be performed by a quad controller 170 in communication with other components of the control system 160 within a quad vehicle 100.

In block 410, the method 400 may optionally include controlling actuators located at a central hub to extend a respective leg segment coupled to a respective wheel downward and outward from the central hub. In an aspect, for example, the quad controller 170 may execute the suspension controller 172 to control the suspension pivots 116 at the central hub 110 to extend a respective first leg segment 132 coupled to a respective wheel 150 downward and outward from the central hub 110. Extending the respective first leg segments 132 may transition the quad vehicle 100 from a retracted state 320 to an intermediate state 310.

In block 420, the method 400 may optionally include generating control signals to drive a forward pair of the drive motors in a forward direction and a rear pair of the drive motors in a reverse direction to extend a respective joint between the respective leg segment and the respective wheel. For example, the quad controller 170 may execute the drive controller 174 to drive a forward pair of the drive motors 140*a*, 140*b* in the forward direction and the rear pair of the drive motors 140*c*, 140*d* in the reverse direction to extend a respective joint 138 between the respective first leg segment 132 and the respective wheel 150. Driving the drive motors 140 and respective wheels 150 in opposite directions may transition the quad vehicle 100 from the intermediate state 310 to the extended state 300. In an aspect, block 420 may be performed concurrently with block 410 to also assist in transitioning the quad vehicle 100 from a retracted state 320 to an intermediate state 310.

In block 430, the method 400 may optionally include locking the respective joint prior to generating control signals for each of the four drive motors based on at least the input signals. In an aspect, for example, the quad controller 170 may execute the suspension controller 172 to lock the respective joints 138 prior to generating control signals for each of four drive motors 140 based on input signals from rider controls. That is, the quad controller 170 may lock the quad vehicle 100 in the extended state 300 prior to allowing a rider to control the quad vehicle 100. Control signals while transitioning to the extended state 300 may be generated by the drive controller 174 to perform predefined movements.

In block 440, the method 400 may include receiving input signals from a rider indicating a relative acceleration amount and a relative steering amount. In an aspect, for example, the quad controller 170 may execute the steering input 184 to receive input signals from a rider indicating a relative acceleration amount and a relative steering amount. The rider may generate the input signals using the controls 114 on the handlebars 112.

In block 450, the method 400 may include generating control signals for each of four drive motors based on at least the input signal. In an aspect, for example, the quad controller 170 may execute the drive controller 174 to generate the control signals for each of the four drive motors 140 based on at least the throttle input 182 and the steering input 184. The drive controller 174 may also generate the control signals based on the sensor input 180. For example, in sub-block 452, the block 450 may include detecting a stress level of a rider. For instance, the sensor input 180 may be a stress level of the rider detected by a heart rate monitor or an EDA meter. In sub-block 454, the block 450 may include adjusting the control signals based on the stress level of the rider. For example, the drive controller 174 may adjust the control signals based on the stress level of the driver. In an aspect, the drive controller 174 may scale down the control signals in response to high stress levels to reduce the speed or acceleration of the quad vehicle 100.

In block 460, the method 400 may include controlling a power output to each of the four drive motors according to the respective control signal. In an aspect, for example, the drive controller 174 may control the power output to each of the four drive motors 140 according to the respective control signal.

In block 470, the method 400 may optionally include controlling actuators located at a central hub to retract a respective leg segment coupled to a respective wheel upward and inward from the central hub. In an aspect, for example, the quad controller 170 may execute the suspension controller 172 to control the suspension pivots 116 at the central hub 110 to retract a respective first leg segment 132 coupled to a respective wheel 150 upward and inward from the central hub 110. Retracting the respective first leg segments 132 may transition the quad vehicle 100 to the retracted state 320.

Figure 5:
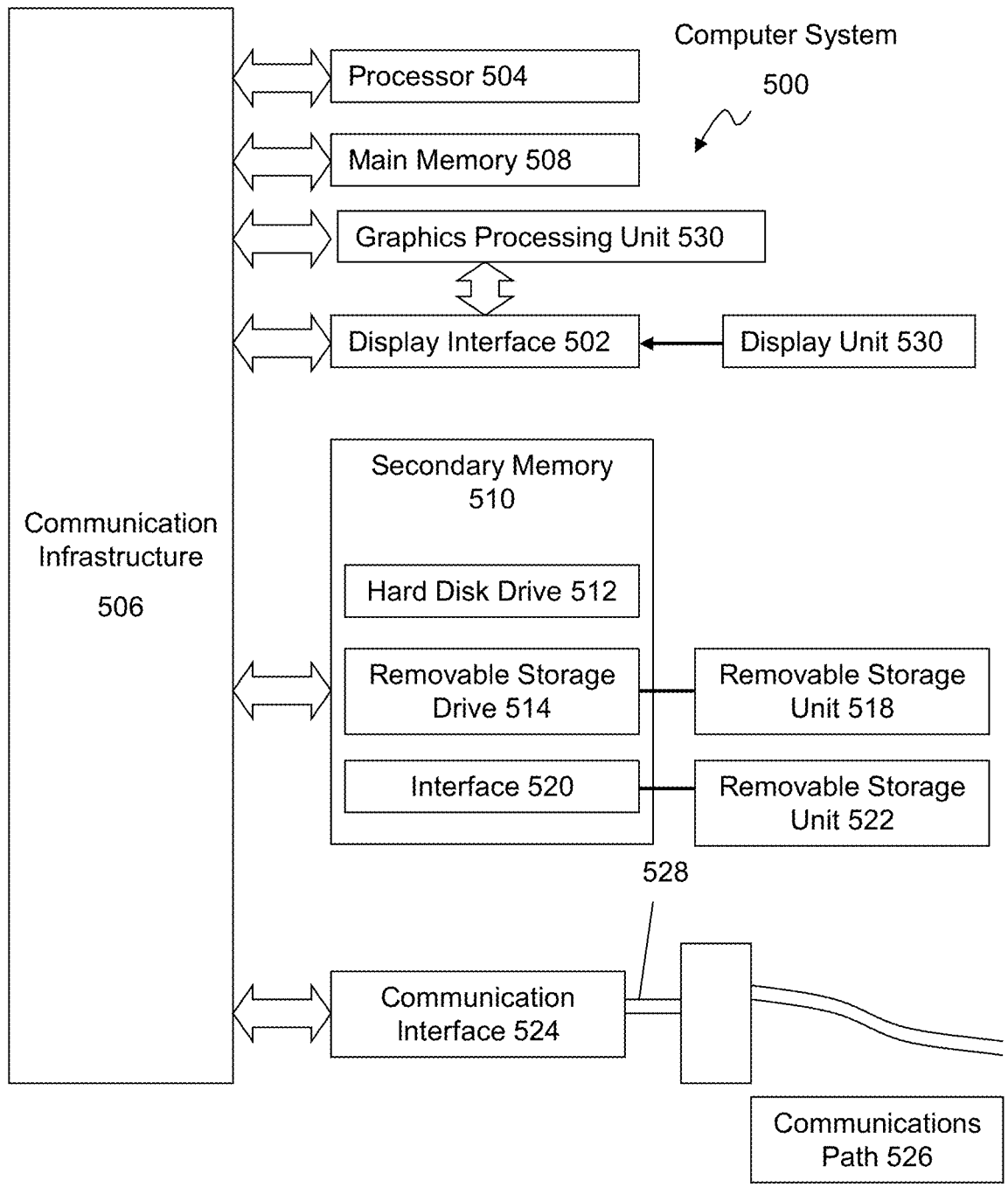
FIG. 5 presents an exemplary system diagram of various hardware components and other features for use in accordance with aspects of the present disclosure.

Aspects of the present disclosure may be implemented using hardware, software, or a combination thereof and may be implemented in one or more computer systems or other processing systems. In one aspect, the disclosure is directed toward one or more computer systems capable of carrying out the functionality described herein. For example, the computer system may implement the quad controller 170. FIG. 5 presents an example system diagram of various hardware components and other features that may be used in accordance with aspects of the present disclosure. Aspects of the present disclosure may be implemented using hardware, software, or a combination thereof and may be implemented in one or more computer systems or other processing systems. In one exemplary variation, aspects of the disclosure are directed toward one or more computer systems capable of carrying out the functionality described herein. An example of such a computer system 500 is shown in FIG. 5.

Computer system 500 includes one or more processors, such as processor 504. The processor 504 is connected to a communication infrastructure 506 (e.g., a communications bus, cross-over bar, or network). Various software aspects are described in terms of this example computer system. After reading this description, it will become apparent to a person skilled in the relevant art(s) how to implement aspects of the disclosure using other computer systems and/or architectures.

Computer system 500 may include a display interface 502 that forwards graphics, text, and other data from the communication infrastructure 506 (or from a frame buffer not shown) for display on a display unit 530. In an aspect, the display unit 530 may correspond to the display device 169. Computer system 500 also includes a main memory 508, preferably random access memory (RAM), and may also include a secondary memory 510. The secondary memory 510 may include, for example, a hard disk drive 512 and/or a removable storage drive 514, representing a floppy disk drive, a magnetic tape drive, an optical disk drive, etc. The removable storage drive 514 reads from and/or writes to a removable storage unit 518 in a well-known manner. Removable storage unit 518, represents a floppy disk, magnetic tape, optical disk, etc., which is read by and written to removable storage drive 514. As will be appreciated, the removable storage unit 518 includes a computer usable storage medium having stored therein computer software and/or data.

In alternative aspects, secondary memory 510 may include other similar devices for allowing computer programs or other instructions to be loaded into computer system 500. Such devices may include, for example, a removable storage unit 522 and an interface 520. Examples of such may include a program cartridge and cartridge interface (such as that found in video game devices), a removable memory chip (such as an erasable programmable read only memory (EPROM), or programmable read only memory (PROM)) and associated socket, and other removable storage units 522 and interfaces 520, which allow software and data to be transferred from the removable storage unit 522 to computer system 500.

Computer system 500 may also include a communications interface 524. Communications interface 524 allows software and data to be transferred between computer system 500 and external devices. Examples of communications interface 524 may include a modem, a network interface (such as an Ethernet card), a communications port, a Personal Computer Memory Card International Association (PCMCIA) slot and card, etc. Software and data transferred via communications interface 524 are in the form of signals 528, which may be electronic, electromagnetic, optical or other signals capable of being received by communications interface 524. These signals 528 are provided to communications interface 524 via a communications path (e.g., channel) 526. This path 526 carries signals 528 and may be implemented using wire or cable, fiber optics, a telephone line, a cellular link, a radio frequency (RF) link and/or other communications channels. In this document, the terms "computer program medium" and "computer usable medium" are used to refer generally to media such as a removable storage drive 514, a hard disk installed in hard disk drive 512, and signals 528. These computer program products provide software to the computer system 500. Aspects of the disclosure are directed to such computer program products.

Computer programs (also referred to as computer control logic) are stored in main memory 508 and/or secondary memory 510. Computer programs may also be received via communications interface 524. Such computer programs, when executed, enable the computer system 500 to perform various features in accordance with aspects of the present disclosure, as discussed herein. In particular, the computer programs, when executed, enable the processor 504 to perform such features. Accordingly, such computer programs represent controllers of the computer system 500.

In variations where aspects of the disclosure are implemented using software, the software may be stored in a computer program product and loaded into computer system 500 using removable storage drive 514, hard disk drive 512, or communications interface 520. The control logic (software), when executed by the processor 504, causes the processor 504 to perform the functions in accordance with aspects of the disclosure as described herein. In another variation, aspects are implemented primarily in hardware using, for example, hardware components, such as application specific integrated circuits (ASICs). Implementation of the hardware state machine so as to perform the functions described herein will be apparent to persons skilled in the relevant art(s).

In yet another example variation, aspects of the disclosure are implemented using a combination of both hardware and software.

Figure 6:
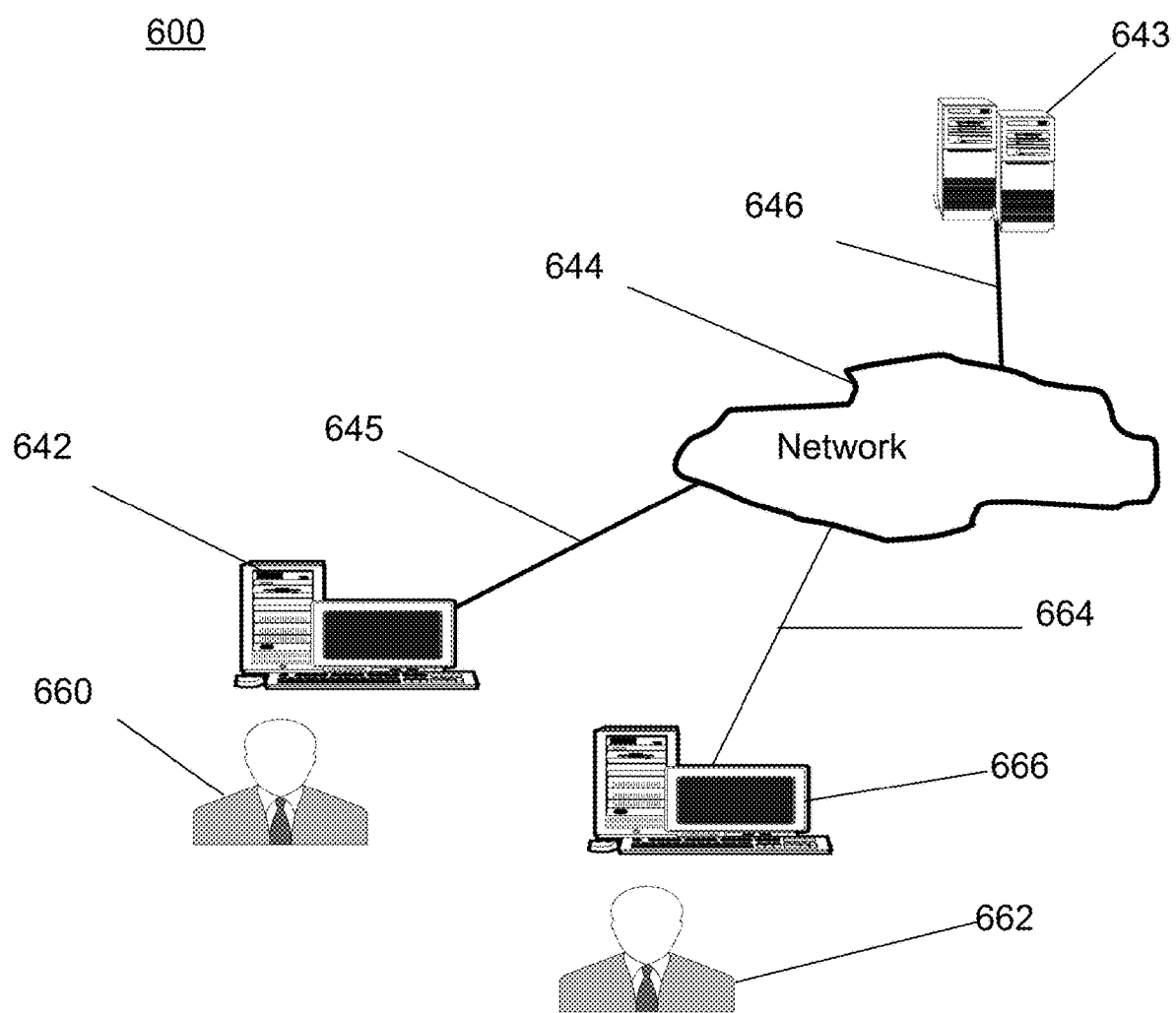
FIG. 6 is a block diagram of various exemplary system components for use in accordance with aspects of the present disclosure.

FIG. 6 is a block diagram of various example system components that may be used in accordance with aspects of the present disclosure. For example, the various components may be within the vehicle 100, or only some of the components may be within the vehicle 100, and other components may be remote from the vehicle 100. The system 600 includes one or more accessors 660, 662 (also referred to interchangeably herein as one or more "users") and one or more terminals 642, 666 (such terminals may be or include, for example, various features of the control system 160). In one aspect, data for use in accordance with aspects of the present disclosure is, for example, input and/or accessed by accessors 660, 662 via terminals 642, 666, such as personal computers (PCs), minicomputers, mainframe computers, microcomputers, telephonic devices, or wireless devices, such as personal digital assistants ("PDAs") or a hand-held wireless devices coupled to a server 643, such as a PC, minicomputer, mainframe computer, microcomputer, or other device having a processor and a repository for data and/or connection to a repository for data, via, for example, a network 644, such as the Internet or an intranet, and couplings 645, 646, 664. The couplings 645, 646, 664 include, for example, wired, wireless, or fiber optic links. In another example variation, the method and system in accordance with aspects of the present disclosure operate in a stand-alone environment, such as on a single terminal.

The aspects of the disclosure discussed herein may also be described and implemented in the context of computer-readable storage medium storing computer-executable instructions. Computer-readable storage media includes computer storage media and communication media. For example, flash memory drives, digital versatile discs (DVDs), compact discs (CDs), floppy disks, and tape cassettes. Computer-readable storage media may include volatile and nonvolatile, removable and non-removable media implemented in any method or technology for storage of information such as computer readable instructions, data structures, modules or other data.

It will be appreciated that various implementations of the above-disclosed and other features and functions, or alternatives or varieties thereof, may be desirably combined into many other different systems or applications. Also that various presently unforeseen or unanticipated alternatives, modifications, variations, or improvements therein may be subsequently made by those skilled in the art which are also intended to be encompassed by the following claims.

What is claimed is:

1. An electric quad vehicle, comprising:
    a central hub;
    four legs, each pivotably mounted to the central hub, each leg including an electric motor rotatably coupled to a wheel, wherein each leg includes a respective joint between the central hub and the wheel allowing the leg to bend to a retracted state with the wheel adjacent to the central hub;
    handle bars extending from the central hub including rider controls of acceleration and steering; and
    a control system configured to translate rider input to the rider controls into control signals for each of the electric motors.

2. The electric quad vehicle of claim 1, wherein the handle bars fold to a location within the central hub.

3. The electric quad vehicle of claim 1, further comprising a power source located within the central hub.

4. The electric quad vehicle of claim 1, wherein the central hub allows horizontal and vertical pivoting of each leg.

5. The electric quad vehicle of claim 1, wherein the central hub exerts a downward rotational force on each leg.

6. The electric quad vehicle of claim 5, wherein the downward rotational force is electrically variable via a respective electronic actuator or motor coupled to the central hub and the leg that controls the downward rotational force.

7. The electric quad vehicle of claim 1, wherein each joint locks in an extended state during use of the electric quad vehicle and bends to an acute angle when the electric quad vehicle is in the retracted state.

8. The electric quad vehicle of claim 1, wherein the control system is configured to lock the respective joint prior to generating the control signals for each of the four drive motors based on at least the input signals.

9. The electric quad vehicle of claim 1, further comprising a saddle covering the central hub, the saddle including a seat and two flexible extensions on opposite sides of the central hub that support a respective foot support.

10. The electric quad vehicle of claim 9, wherein the saddle includes a sensor that detects a stress level of a rider, wherein the controller is configured to adjust the control signals based on the stress level of the rider.

11. The electric quad vehicle of claim 1, wherein the wheels are mechanically fixed in a forward orientation, and wherein the control system is configured to steer the electric quad vehicle by providing different control signals to each of the electric motors.

12. A method of operating an electric quad vehicle, comprising:
    controlling actuators located at a central hub to extend a respective leg segment coupled to a respective wheel downward and outward from the central hub;
    generating control signals to drive a forward pair of the drive motors in a forward direction and a rear pair of the drive motors in a reverse direction to extend a respective joint between the respective leg segment and the respective wheel;
    receiving input signals from rider controls indicating a relative acceleration amount and a relative steering amount;
    generating control signals for each of four drive motors based on at least the input signals; and
    controlling a power output to each of the four drive motors according to the respective control signal.

13. The method of claim 12, further comprising:
    detecting a stress level of a rider; and
    adjusting the control signals based on the stress level of the rider.

14. The method of claim 12, further comprising locking the respective joint prior to generating the control signals for each of the four drive motors based on at least the input signals.

15. The method of claim 12, further comprising controlling the actuators to exert a variable downward rotational force on each leg in response to movement of the central hub.

16. The method of claim 12, further comprising controlling actuators located at a central hub to retract a respective leg segment coupled to a respective wheel upward and inward from the central hub.

17. A vehicle control system for an electric quad vehicle comprising:
- a memory;
- a processor communicatively coupled to the memory and configured to:
- control actuators located at a central hub to extend a respective leg segment coupled to a respective wheel downward and outward from the central hub;
- generate control signals to drive a forward pair of the drive motors in a forward direction and a rear pair of the drive motors in a reverse direction to extend a respective joint between the respective leg segment and the respective wheel;
- receive input signals from a rider indicating a relative acceleration amount and a relative steering amount;
- generate control signals for each of four drive motors based on at least the input signals; and
- control a power output to each of the four drive motors according to the respective control signal.

18. The vehicle control system of claim 17, wherein the processor is further configured to lock the respective joint prior to generating the control signals for each of the four drive motors based on at least the input signals.

* * * * *